United States Patent
Zhang et al.

(10) Patent No.: US 6,956,063 B2
(45) Date of Patent: *Oct. 18, 2005

(54) METHOD FOR REDUCING WATER CONCENTRATION IN A MULTI-PHASE COLUMN REACTOR

(75) Inventors: Jianping Zhang, Ponca City, OK (US); Rafael L. Espinoza, Ponca City, OK (US)

(73) Assignee: ConocoPhillips Company, Houston, TX (US)

( * ) Notice: Subject to any disclaimer, the term of this patent is extended or adjusted under 35 U.S.C. 154(b) by 102 days.

This patent is subject to a terminal disclaimer.

(21) Appl. No.: 10/315,571

(22) Filed: Dec. 10, 2002

(65) Prior Publication Data

US 2003/0134913 A1 Jul. 17, 2003

Related U.S. Application Data

(63) Continuation-in-part of application No. 10/034,452, filed on Dec. 28, 2001, now Pat. No. 6,720,358.
(60) Provisional application No. 60/344,228, filed on Dec. 28, 2001, and provisional application No. 60/344,229, filed on Dec. 28, 2001.

(51) Int. Cl.$^7$ .................. C07C 27/00; B01D 37/00; B01D 21/00
(52) U.S. Cl. .................. 518/700; 518/705; 210/767; 210/800
(58) Field of Search .................. 518/700, 705; 210/767, 800

(56) References Cited

U.S. PATENT DOCUMENTS

| | | |
|---|---|---|
| 2,509,136 A | 5/1950 | Cornell |
| 2,617,816 A | 11/1952 | Crowell et al. |
| 3,432,036 A | 3/1969 | Kaiser |
| 3,807,142 A | 4/1974 | Rich et al. |
| 4,093,643 A | 6/1978 | Vannice et al. ............. 260/449 |
| 4,428,839 A | 1/1984 | Davies et al. ............ 210/512.3 |
| 4,520,215 A | 5/1985 | Owen et al. ................ 585/255 |
| 4,605,678 A | 8/1986 | Brennan et al. |

(Continued)

FOREIGN PATENT DOCUMENTS

| | | | |
|---|---|---|---|
| FR | 2807027 | 3/2000 | ............ C02F/1/28 |
| WO | WO99/64380 | 12/1999 | ............. C07C/1/04 |

OTHER PUBLICATIONS

PCT International Search Report for International Application No. PCT/US02/40292 dated Feb. 23, 2003 (2 p.).
Schulz et al., *Applied Catalyst* vol. 186 Nos. 1,2 Oct. 1999 (229 p.).
PCT International Search Report for International Application No. PCT/US02/40239, dated Feb. 22, 2003 (6 p.).
PCT International Search Report for International Application No. PCT/US02/41012 dated Mar. 9, 2003 (2 p.).

(Continued)

*Primary Examiner*—J. Parsa
(74) *Attorney, Agent, or Firm*—Conley Rose P.C.

(57) ABSTRACT

The present invention relates to a method and apparatus for water removal in multi-phase reactors operating at Fischer-Tropsch conditions. In a preferred embodiment of the present invention, a method of reducing the concentration of water in a multi-phase reactor for Fisher-Tropsch synthesis containing an expanded slurry bed and a water-rich slurry region includes removing a portion of water from the water-rich slurry from a predetermined region in the reactor, removing the water from the water-rich slurry to form a water-reduced slurry, and returning the water-reduced slurry back to the reactor. Preferably the water-rich slurry region is located between ½ H to H and ½ R to R, where H is the height of the expanded slurry bed and R is the radius of the expanded slurry bed.

28 Claims, 5 Drawing Sheets

U.S. PATENT DOCUMENTS

| | | |
|---|---|---|
| 4,973,453 A | 11/1990 | Agee |
| 5,015,366 A | 5/1991 | Ruether et al. |
| 5,023,276 A | 6/1991 | Yarrignton et al. .......... 514/703 |
| 5,240,593 A | 8/1993 | Moredock .................... 210/87 |
| 5,260,239 A | 11/1993 | Hsia |
| 5,268,344 A | 12/1993 | Pedrick et al. |
| 5,276,237 A | 1/1994 | Mieville |
| 5,288,673 A | 2/1994 | Behrmann et al. |
| 5,348,982 A | 9/1994 | Herbolzheimer et al. |
| 5,407,644 A | 4/1995 | Rytter et al. |
| 5,422,375 A | 6/1995 | Rytter et al. |
| 5,520,890 A | 5/1996 | Lorentzen et al. |
| 5,527,473 A | 6/1996 | Ackerman |
| 5,565,177 A | 10/1996 | Cetinkaya |
| 5,639,798 A | 6/1997 | Wilson et al. |
| 5,770,629 A | 6/1998 | Degeroge et al. |
| 5,811,469 A | 9/1998 | Leviness et al. |
| 5,827,902 A | 10/1998 | Maretto et al. |
| 5,827,903 A | 10/1998 | White et al. |
| 5,844,006 A | 12/1998 | Jager et al. |
| 5,900,159 A | 5/1999 | Engel et al. |
| 5,917,078 A | 6/1999 | Battosta et al. |
| 5,939,350 A | 8/1999 | Singleton et al. |
| 5,948,378 A | 9/1999 | Koveal et al. .............. 423/236 |
| 5,958,985 A | 9/1999 | Geerling et al. |
| 5,961,933 A | 10/1999 | Casanave et al. |
| 5,962,537 A | 10/1999 | Leviness |
| 5,981,608 A | 11/1999 | Geerling et al. |
| 6,060,524 A | 5/2000 | Casanave et al. |
| 6,068,760 A | 5/2000 | Benham et al. |
| 6,069,179 A | 5/2000 | Rytter et al. |
| 6,100,304 A | 8/2000 | Singleton et al. |
| 6,114,400 A | 9/2000 | Nataraj et al. .............. 518/715 |
| 6,156,809 A | 12/2000 | Clark et al. .................. 518/719 |
| 6,169,120 B1 | 1/2001 | Beer ........................... 518/715 |
| 6,191,066 B1 | 2/2001 | Singleton et al. |
| 6,225,358 B1 | 5/2001 | Kennedy .................... 518/700 |
| 6,271,432 B2 | 8/2001 | Singleton et al. |
| 6,277,338 B1 | 8/2001 | Agee et al. .................. 422/189 |
| 6,403,660 B1 | 6/2002 | Espinoza et al. |
| 6,462,097 B1 | 10/2002 | Martino et al. |

OTHER PUBLICATIONS

D. Schanke et al., *Study of the Deactivation Mechanism of $Al_2O_3$–Supported Cobalt Fischer–Tropsch Catalysts*, Catalysis Letters 34 (1995) pp. 269–284.

V.A. Kirillov et al., *A Mathmatical Model of Fischer–Tropsch Synthesis in a Slurry Reactor*, Studies in Surface Science and Catalysis, vol. 119, A. Parmaliana et al. Ed., Elsevier Science, 1998, pp. 149–154.

P.J. van Berge et al., *Oxidation of Cobalt Based Fischer–Tropsch Catalysts as a Deactivation Mechanism*, Catalysis Today 58 (000) pp. 321–334.

Rothaemel, et al, "The effect of water on cobalt Fishcer–Tropsch catalysts studied by steady–state isotopic transient kinetic analysis (SSITKA)", Catalysis Today 38, 79–84, (1997).

D., Schanke, et al, "Reoxidation and Deactivation of Supported Cobalt Fischer–Tropsch Catalysts", Energy & Fuels, vol. 10, No. 4, 867–872, (1996).

A. M. Hilmen, et al, "Study of the effect of water on alumina supported cobalt Fishcer–Tropsch catalysts", Applied Catalysis A: General 186, 169–188, (1999).

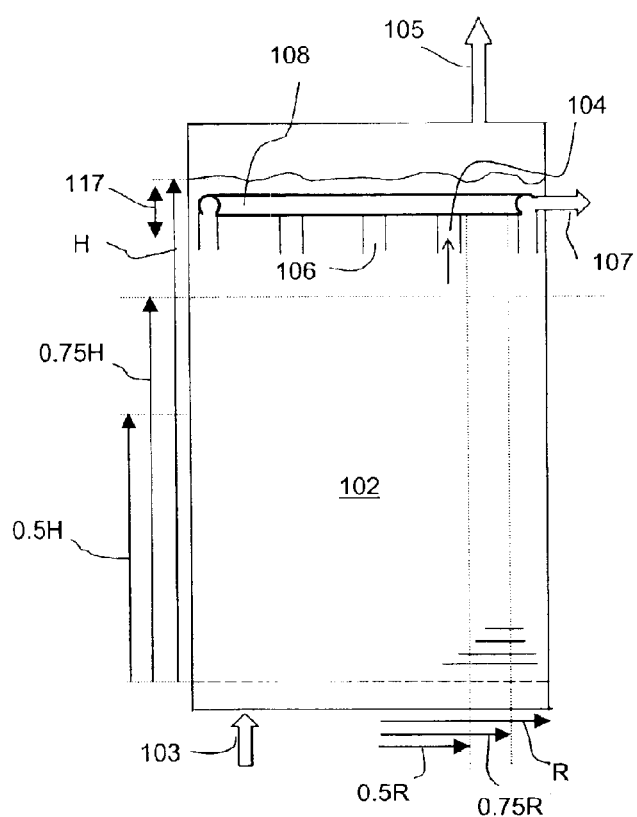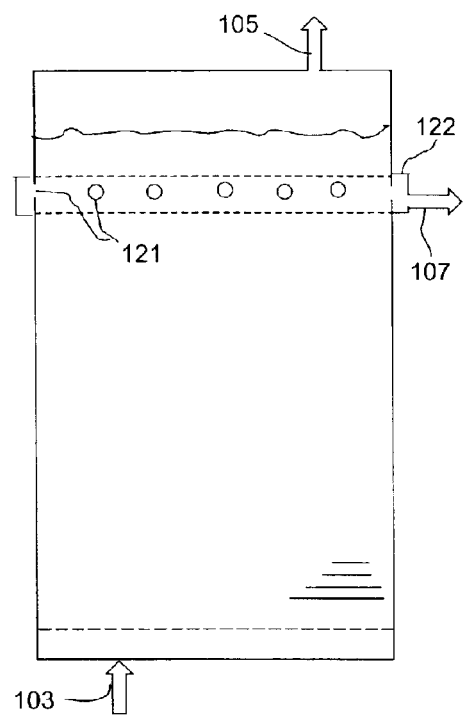
Fig. 6                    Fig. 7

METHOD FOR REDUCING WATER CONCENTRATION IN A MULTI-PHASE COLUMN REACTOR

CROSS-REFERENCE TO RELATED APPLICATIONS

This application is related to commonly assigned, U.S. Utility application Ser. No. 10/034,452 now U.S. Pat. No. 6,720,358, entitled "Water Stripping and Catalyst/Liquid Product Separation System," co-pending Provisional Application Ser. No. 60/344,228 filed Dec. 28, 2001 and entitled "Method For Reducing Water concentration in a Multi-Phase Column Reactor," and co-pending Provisional Application Ser. No. 60/344,229 entitled "Water Removal in Fischer-Tropsch Processes" filed Dec. 28, 2001, each of which is hereby incorporated herein by reference.

FIELD OF THE INVENTION

The present invention relates to a method for the preparation of hydrocarbons from synthesis gas, i.e., a mixture of carbon monoxide and hydrogen, typically labeled the Fischer-Tropsch process. Particularly, this invention relates to a method for in situ water removal in multi-phase column reactors operating at Fischer-Tropsch conditions.

BACKGROUND OF THE INVENTION

Large quantities of methane, the main component of natural gas, are available in many areas of the world, and natural gas is predicted to outlast oil reserves by a significant margin. However, most natural gas is situated in areas that are geographically remote from population and industrial centers. The costs of compression, transportation, and storage make its use economically unattractive. To improve the economics of natural gas use, much research has focused on the use of methane as a starting material for the production of higher hydrocarbons and hydrocarbon liquids, which are more easily transported and thus more economical. The conversion of methane to hydrocarbons is typically carried out in two steps. In the first step, methane is converted into a mixture of carbon monoxide and hydrogen (i.e., synthesis gas or syngas). In a second step, the syngas is converted into useful hydrocarbons.

This second step, the preparation of hydrocarbons from synthesis gas, is well known in the art and is usually referred to as Fischer-Tropsch synthesis, the Fischer-Tropsch process, or Fischer-Tropsch reaction(s). Fischer-Tropsch synthesis generally entails contacting a stream of synthesis gas with a catalyst under temperature and pressure conditions that allow the synthesis gas to react and form hydrocarbons.

More specifically, the Fischer-Tropsch reaction is the catalytic hydrogenation of carbon monoxide to produce any of a variety of products ranging from methane to higher hydrocarbons including olefins, paraffins, alcohols, and other oxygenated hydrocarbons. Research continues on the development of more efficient Fischer-Tropsch catalyst systems and reaction systems that increase the selectivity for high-value hydrocarbons in the Fischer-Tropsch product stream.

There are continuing efforts to design reactors that are more effective at producing these desired products. Product distribution, product selectivity, and reactor productivity depend heavily on the type and structure of the catalyst and on the reactor type and operating conditions. Catalysts for use in such synthesis usually contain a catalytically active metal of Groups 8, 9, or 10 (in the New notation of the periodic table of the elements, which is followed throughout). In particular, iron, cobalt, nickel, and ruthenium have been abundantly used as the catalytically active metals. Cobalt and ruthenium have been found to be most suitable for catalyzing a process in which synthesis gas is converted primarily to hydrocarbons having five or more carbon atoms (i.e., where the $C_{5+}$ selectivity of the catalyst is high).

Originally, the Fischer-Tropsch synthesis was operated in packed bed reactors. These reactors have several drawbacks, such as difficulty of temperature control, that can be overcome by using gas-agitated slurry reactors or slurry bubble column reactors. Gas-agitated reactors, sometimes called "slurry reactors," "slurry bubble columns," or "multi-phase reactors" operate by suspending catalytic particles in liquid and feeding gas reactants into the bottom of the reactor through a gas distributor, which produces gas bubbles. As the gas bubbles rise through the reactor, the reactants are absorbed into the liquid and diffuse to the catalyst where, depending on the catalyst system, they are converted to gaseous and liquid products. The gaseous products formed enter the gas bubbles and are collected at the top of the reactor. Liquid products are recovered from the suspended solid using any suitable technique, such as settling, filtration, magnetic separation, hydrocycloning, or the like, and then separating the liquids.

A known problem in multi-phase reactors, however, is that water is continuously formed during Fisher-Tropsch synthesis in the reactors. This is known to limit conversion and increase the deactivation rate of catalyst systems such as iron and cobalt-based Fisher-Tropsch catalysts through an oxidation mechanism. As is well known in the art, a high water partial pressure correlates to a high deactivation rate. This is detrimental to the overall system performance, since two requirements for a successful commercial application of cobalt-based Fischer-Tropsch catalysts are a high per-pass conversion and, for middle distillates production, a high wax selectivity (or a high alpha value).

For any given cobalt-based catalyst, along with the $H_2/CO$ ratio and the reaction temperature, the total pressure is a parameter that has a direct influence on the wax selectivity, in that a higher pressure will result in a higher wax selectivity. However, a higher total pressure (at any given degree of per-pass conversion) also correlates to a higher water partial pressure and therefore a higher deactivation rate. Therefore, if reactors are operated at conditions that are conducive to higher alpha values, per-pass conversion will necessarily have to be low to avoid premature catalyst deactivation due to water. A low per-pass conversion is undesirable, however, because it results in higher capital investment and operating costs. Additionally, for iron-based catalysts, the water not only has a negative effect on the catalyst deactivation rate, but it also inhibits the rate of reaction.

The water partial pressure is therefore a constraint that will not allow the realization of the kinetic and/or wax selectivity potential of iron and cobalt-based Fisher-Tropsch catalysts. Therefore, in order to improve the efficiency of multi-phase reactors using iron and cobalt-based catalyst systems, there exists a need for a method to remove water formed during Fisher-Tropsch synthesis.

SUMMARY OF THE INVENTION

The present invention relates to a method for water removal in multi-phase reactors operating at Fischer- Tropsch conditions. More particularly, the present invention describes an optimal region for removing water from the reactor. This method allows removal of water dissolved in the wax, water contained in very small bubbles in the wax, and water absorbed on the catalyst surface, therefore allowing a higher per-pass conversion while protecting the catalyst from excessive oxidation. Further, by allowing a higher per-pass conversion, fewer reactor stages may be necessary to achieve a suitable overall conversion.

In a preferred embodiment of the present invention, a method of reducing the concentration of water in a multi-phase reactor containing an expanded slurry bed and a water-rich slurry for Fisher-Tropsch synthesis includes removing a portion of water from the water-rich slurry from a predetermined region in the reactor, removing water from the water-rich slurry using a water removal means to form a water-reduced slurry, and returning the water-reduced slurry back to the reactor. Preferably the predetermined region is located between ½ H and H and between ½ R and R, where H is the height of the expanded slurry bed and R is the radius of the expanded slurry bed. The expanded slurry bed is herein defined as the region within a reactor where an intimate liquid-solid-gas phase contact exists.

In another preferred embodiment of the present invention, a method for producing hydrocarbons includes contacting a synthesis gas with a hydrocarbon synthesis catalyst in a multiphase reactor having an expanded slurry bed, including a predetermined water-rich slurry region, under reaction conditions effective to form gaseous and/or liquid product streams comprising hydrocarbons and secondary products from the synthesis gas. A portion of the the slurry from the predetermined water-rich slurry region in the reactor is removed to form a water-rich slurry stream and is sent to a water removal zone, which removes water from the water-rich slurry stream to form a water-reduced slurry stream. Lastly, the water-reduced slurry stream is passed back into the reactor.

The present invention allows higher per-pass conversions of syngas and/or use of higher total pressures for any given degree of conversion, while protecting the Fischer-Tropsch catalyst from an excessive oxidation rate. By returning the water-reduced slurry back into the reactor, the water-reduced slurry has time to undergo further reaction, forming a longer chain hydrocarbon product.

BRIEF DESCRIPTION OF THE FIGURES

A better understanding of the present invention can be obtained when the following detailed description of the preferred embodiment is considered in conjunction with the following drawings:

FIG. 6 is a schematic cross-sectional side view of a multi-phase reactor system in accordance with an alternative embodiment of the present invention; and FIG. 7 is a schematic cross-sectional side view of a multi-phase reactor system in accordance with an alternative embodiment of the present invention.

DETAILED DESCRIPTION OF THE PREFERRED EMBODIMENTS

According to the present invention, a water removal means may be employed to extract certain components, including water, from a multi-phase column reactor operating at Fischer-Tropsch conditions. In typical Fischer-Tropsch processes, water begins to accumulate in the operating reactor, forming a water-rich slurry. As mentioned above, this is undesirable because water has a negative effect on the catalyst deactivation rate and inhibits the rate of reaction. To minimize this problem, in a preferred embodiment of the invention a portion of the water-rich slurry is removed from a predetermined region within the reactor and then passed through a water removal means to form a water-reduced slurry. The water-reduced slurry is then preferably returned to the reactor. Thus, the concentration of water is reduced both in the slurry and in the reactor.

Figure 1:
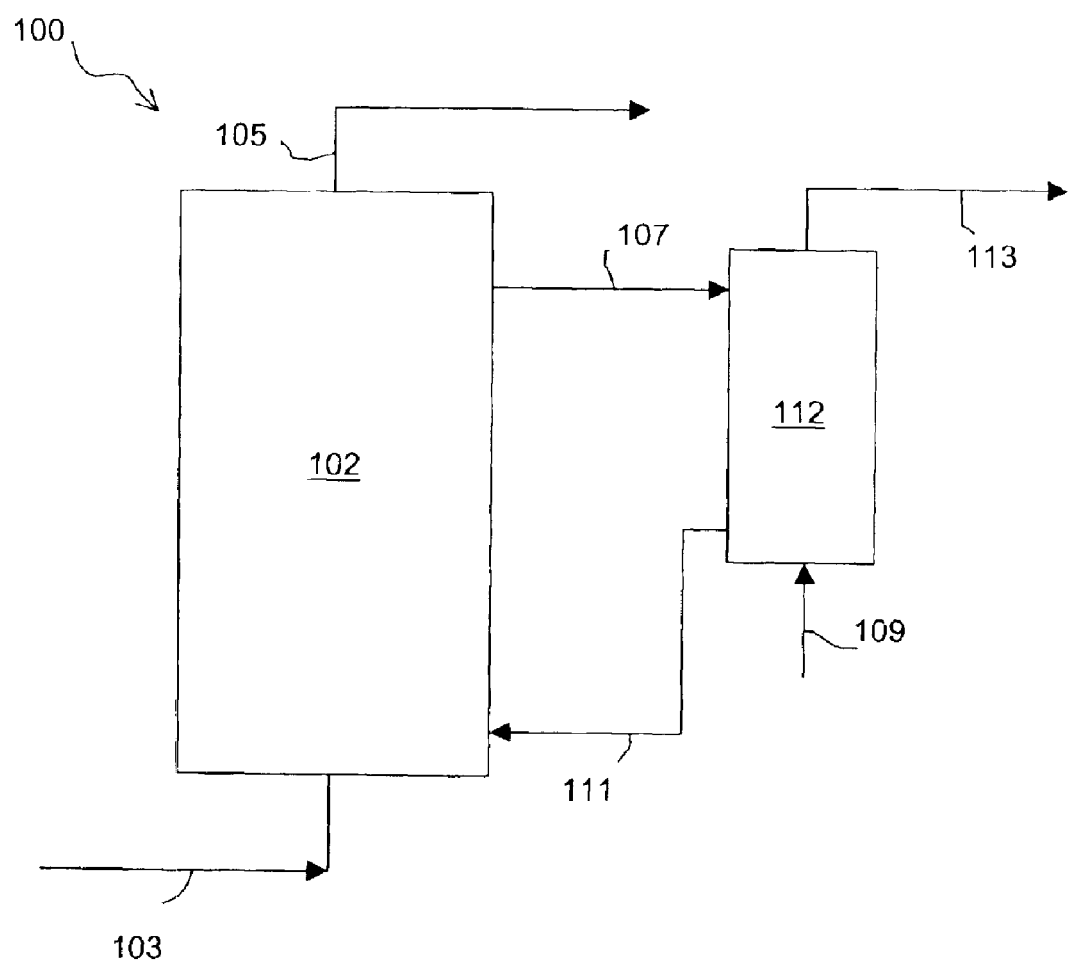
FIG. 1 is a schematic diagram of a multi-phase reactor system including a separation unit in accordance with a preferred embodiment of the present invention.

Referring initially to FIG. 1, a multi-phase reactor system 100 in accordance with the present invention comprises a multi-phase reactor 102 and a separation unit 112. As described earlier, multi-phase reactor 102 is operated by suspending catalytic particles in a liquid and feeding gaseous reactants 103 into the bottom of the reactor. As the reactants bubble up through the slurry in the reactor 102, they are absorbed into the liquid and diffuse to the catalyst where, depending on the catalyst system, they are converted to gaseous and/or liquid products. Gaseous products of the reaction exit at the top of the reactor via line 105.

Liquid products (water-rich slurry) leave multi-phase reactor 102 via line 107 and enter separation unit 112. Separation unit 112 separates and removes water from the slurry. A stream of reduced-water slurry is produced, and can be returned to reactor 102 via line 111. It will be understood that the terms "water-rich" and "water-lean" or "reduced-water" are relative terms and are not intended to imply any particular water concentration. The water-removal can be performed in continuous or batch mode. Similarly, any suitable method or apparatus for preferentially removing water from the slurry, so that the concentration of water in the slurry decreases, can be used.

In one embodiment, a stream of inert gas 109 is introduced into unit 112 in countercurrent flow to the water-rich slurry, and strips water from the slurry. Gases that are typically available in GTL plants, such as methane, hydrogen, and nitrogen, or other gases that are not detrimental to the catalyst/wax system are suitable for use as the stripping gas. Introduction of the stripping gas to the slurry reduces the water partial pressure in the mixture, creating a driving force for mass transfer from the liquid to the gas phase and forming a water-rich vapor phase comprising the stripping gas and water. The water-rich vapor phase leaves water-removal unit 112 via line 113. If desired, the water-rich gaseous vapor in line 113 may be condensed so that two phases are formed, namely a stripping agent rich phase and a water-rich phase. The stripping agent rich phase is preferably recycled to the stripping process. Subsequent processing of the water-rich phase may be performed by processes known in the art to recover the material and render the water suitable for disposal. See concurrently filed U.S.

patent application Ser. No. 10/034,452 entitled "Water Stripping and Catalyst/Liquid Product Separation System," which is incorporated herein by reference. In the embodiment shown, the dewatered slurry is returned to reactor 102 via line 111.

In alternative embodiments, water removal is effected by use of either phase creation or phase addition. Phase creation involves the creation of a second phase, which is immiscible with the feed phase. Similarly, phase addition involves the addition of a second phase, which is immiscible with the feed phase. In either case, at least partial separation is the components of the feed phase results from the differing solubilities of those components in the immiscible phases.

Regardless of separation technique, preferably at least 60% of the water in the slurry stream from the reactor is removed, and more preferably at least 80% of the water is removed. When the reactor is operated in the continuous mode, most of the water in the wax that passes through the stripper, and which would otherwise be present inside the reactor, is removed. The preferred method of circulating slurry from and back to the reactor is a gravity-driven, or density difference-driven loop, but any suitable fluid drive means could be used.

Figure 2:
FIG. 2 is a contour diagram of the water concentration in liquid phase in a multi-phase reactor operating at Fischer-Tropsch conditions.
Figure 3:
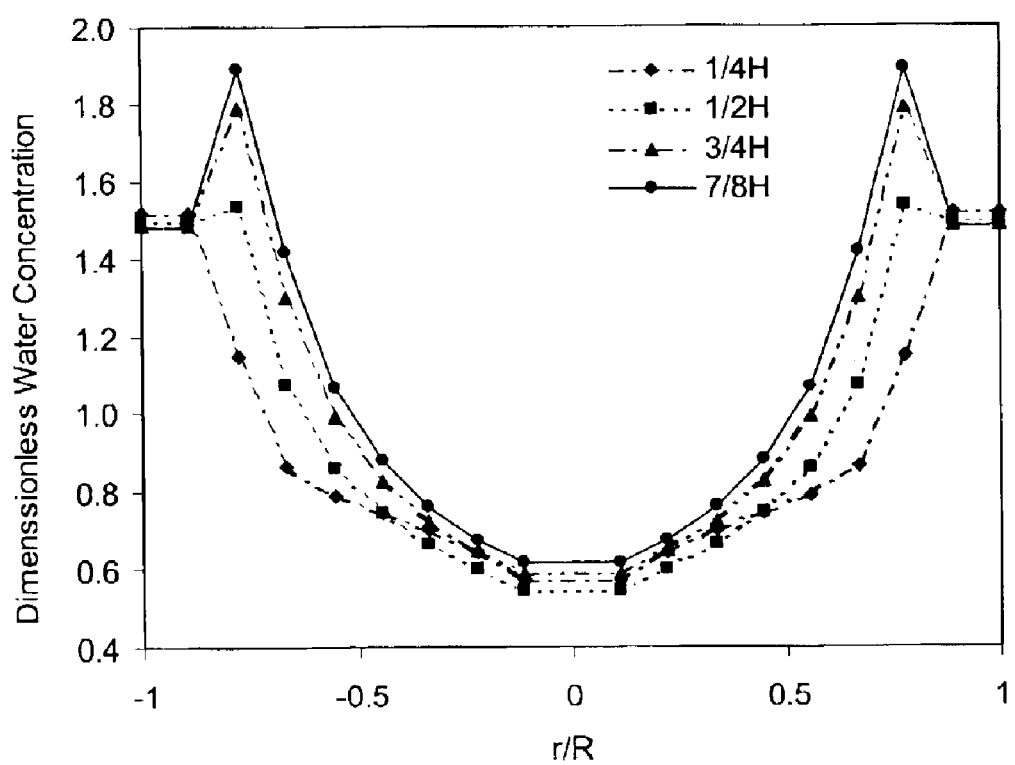
FIG. 3 is a plot of radial profiles of the dimensionless water concentration at four elevations along the expanded slurry bed.

Referring now to FIG. 2, a plot of water concentrations in the liquid phase in a multiphase reactor operating at Fischer-Tropsch conditions is shown. The values of water concentration are color coded, where the lighter shading indicates a higher water concentration and darker shading indicates a lower water concentration. The water concentration distribution in the reactor is further illustrated in FIG. 3, wherein the radial profiles of the dimensionless water concentration are shown at four elevations along the expanded slurry bed. The dimensionless water concentration is defined as the local water concentration divided by the average water concentration of the whole reactor. As shown in FIGS. 2 and 3, the water concentration in the near wall region at the upper half of the expanded slurry bed in the reactor is significantly higher than in other regions in the reactor. More specifically, if the expanded slurry bed is defined as having a height H and a radius R, the high water concentration tends to be located radially between approximately 0.5R and R and vertically between approximately 0.5H and H. Still more specifically, the high water concentration is located between approximately 0.75R and 0.875R and vertically between approximately 0.75H and H.

Reduction of the amount of water in the reactor becomes more efficient when water-rich slurry is withdrawn from the high water concentration region in the reactor, passed through a water-removal operation, and recycled back to the reactor as a water-reduced slurry. In some embodiments, heavy product (i.e. waxes) may optionally be removed before the slurry is returned to the reactor.

Figure 4:
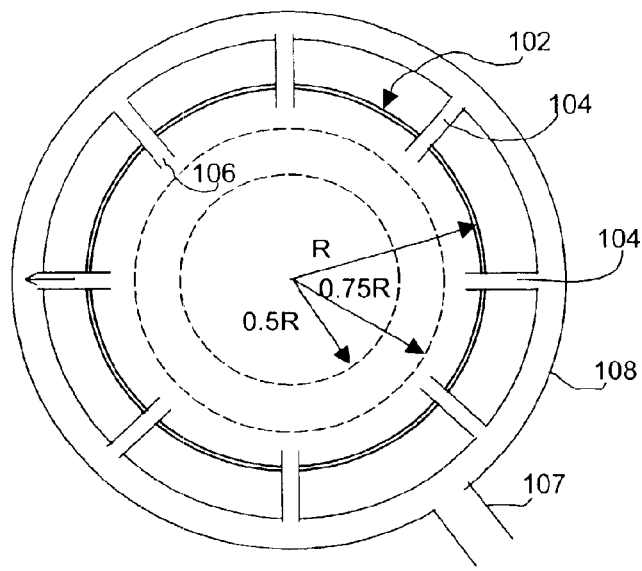
FIG. 4 is a schematic cross-sectional top view of a multi-phase reactor in accordance with a preferred embodiment of the present invention.
Figure 5:
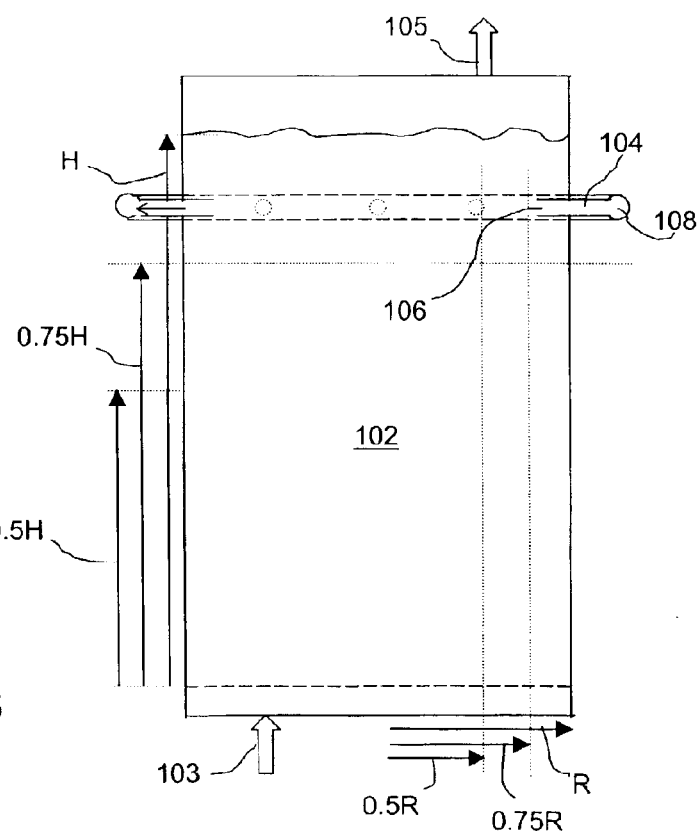
FIG. 5 is a schematic cross-sectional side view of a multi-phase reactor in accordance with a preferred embodiment of the present invention.

Referring now to FIGS. 4 and 5, a multi-phase reactor 102 is shown having uniformly distributed intake ports 104, each port having an intake opening 106. In a preferred embodiment, intake ports 104 withdraw water-rich slurry from the high water concentration region, i.e. the intake openings 106 are positioned between approximately ½ R and R and between approximately ½ H and H. Still more specifically, intake openings 106 are positioned between approximately ¾ R and ⅞ R and between approximately ¾ H and H. Intake ports 104 can extend radially inward from the wall of the reactor, as shown in FIGS. 4 and 5, or can extend downward, as shown in FIG. 6. In either case, intake ports 104 are each preferably in fluid communication with an intake manifold 108. In the embodiment of FIG. 6 in particular, manifold 108 can be moveably mounted as shown by arrow 117, so that it can be raised and lowered to optimize the vertical position of openings 106 in response to changes in the vertical position of the water-rich slurry region within the reactor. Manifold 108 can be positioned above or below the surface of the slurry, and the length of the intake conduits can be altered, so long as openings 106 are positioned at a desired height within the slurry bed.

Intake ports 104 are preferably uniformly distributed around the circumference of reactor 102, so that the flow of water-rich slurry into ports 104 does not disrupt or shift the desired pattern of slurry flow within reactor 102. Thus, it may also be desired to provide at least four, more preferably at least eight, and still more preferably at least 12 intake ports 104. In one preferred embodiment, not shown, ports 104 and openings 106 are replaced with a single annular or toroidal intake ring that is positioned in the slurry, preferably within the region of highest water concentration. The intake ring is preferably perforated or otherwise adapted to receive fluid inflow through a plurality of openings.

In another embodiment, intake ports 104 are omitted and water-rich slurry is removed from reactor 102 through a plurality of holes or openings 121 in the reactor wall, as shown in FIG. 7. Slurry flowing out through openings 121 is received in an annular collector 122 and flows from there into line 107. This embodiment does not provide the radial positioning provided by the embodiments described above. If desired, the reactor wall can be provided with a plurality of rings of openings 121 at different vertical positions, with the rings of openings being selectively closable, such as by one or more moveable sleeves (not shown). In operation only the ring(s) of openings 121 at the desired height are opened. This provides the desired vertical positioning of removal.

Water-rich slurry flowing out of reactor 102 in line 107, such as through intake ports 104 or openings 121, enters a water-removal system such as water removal unit 112. Any suitable water removal means (i.e. separation methods) may be employed in water removal unit 112 to remove water from the water-rich slurry. Some of the water removal means may be incorporated into the multi-phase reactor itself, while others may be independent of the reactor and utilize a slurry transport means. It is contemplated that in cases where the water removal means is independent of the reactor, gas-disengaging means may be utilized between the reactor and the water removal means to ease separation. In addition, different water removal means may be combined with each other in various arrangements to increase the efficiency of overall water removal. Preferred separation methods include separation by phase addition or creation, separation by barrier, separation by solid agent, and separation by external field or gradient. For additional detail, see concurrently filed U.S. patent application Ser. No. 60/344,229 entitled "Water Removal in Fischer-Tropsch Processes," which is incorporated herein by reference.

Fischer-Tropsch Operating Conditions

The feed gases charged to the process of the preferred embodiment of the present invention comprise hydrogen, or a hydrogen source, and carbon monoxide. $H_2/CO$ mixtures suitable as a feedstock for conversion to hydrocarbons according to the process of this invention can be obtained from light hydrocarbons such as methane by means of steam reforming, partial oxidation, or other processes known in the art. If additional hydrogen is needed, it is preferably provided by free hydrogen, although some Fischer-Tropsch catalysts have sufficient water gas shift activity to convert some water to hydrogen for use in the Fischer-Tropsch process. It is preferred that the molar ratio of hydrogen to carbon monoxide in the feed be greater than 0.5:1 (e.g., from about 0.67 to 2.5). Preferably, the feed gas stream contains hydrogen and carbon monoxide in a molar ratio of about 2:1. The feed gas may also contain carbon dioxide. The feed gas stream should contain a low concentration of compounds or elements that have a deleterious effect on the catalyst, such as poisons. For example, the feed gas may need to be pre-treated to ensure that it contains low concentrations of sulfur or nitrogen compounds such as hydrogen sulfide, ammonia and carbonyl sulfides.

The feed gas is contacted with a catalyst in a reaction zone. Mechanical arrangements of conventional design may be employed as the reaction zone including but not limited to, for example, slurry bubble column, reactive distillation column, or ebulliating bed reactors, among others, may be used. Accordingly, the size and physical form of the catalyst particles may vary depending on the reactor in which they are to be used.

The Fischer-Tropsch process is typically run in a continuous mode. In this mode, typically, the gas hourly space velocity through the reaction zone may range from about 50 volumes/hour/volume expanded catalyst bed (v/hr/v) to about 10,000 v/hr/v, preferably from about 300 v/hr/v to about 2,000 v/hr/v. The gas hourly space velocity is defined at normal conditions, where the pressure is 1 bar and the temperature is 0 degree centigrade. The reaction zone temperature is typically in the range from about 160° C. to about 300° C. Preferably, the reaction zone is operated at conversion promoting conditions at temperatures from about 190° C. to about 260° C. The reaction zone pressure is preferably in the range of from about 80 psia (552 kPa) to about 600 psia (4137 kPa), and still more preferably, from about 140 psia (965 kPa) to about 500 psia (3447 kPa).

The products resulting from the process will have a great range of molecular weights. Typically, the carbon number range of the product hydrocarbons will start at methane and continue to about 100 carbons per molecule or more, as measured by current analysis techniques. The process is particularly useful for making hydrocarbons having five or more carbon atoms especially when the above-referenced preferred space velocity, temperature and pressure ranges are employed.

The wide range of hydrocarbons produced in the reaction zone will typically result in liquid phase products being present at the reaction zone operating conditions. Therefore, the effluent stream of the reaction zone will often be a mixed phase stream including liquid and vapor phase products. The effluent stream of the reaction zone may be cooled to condense additional amounts of hydrocarbons and passed into a vapor-liquid separation zone separating the liquid and vapor phase products. The vapor phase material may be passed into a second stage of cooling for recovery of additional hydrocarbons. The liquid phase material from the initial vapor-liquid separation zone together with any liquid from a subsequent separation zone may be fed into a fractionation column where they are separated by boiling point range into products such as naphtha, kerosene and fuel oils. Hydrocarbons recovered from the reaction zone and having a boiling point above that of the desired products may be passed into conventional processing equipment such as a hydrocracking zone in order to reduce their molecular weight. The gas phase recovered from the reactor zone effluent stream after hydrocarbon recovery may be partially recycled if it contains a sufficient quantity of hydrogen and/or carbon monoxide.

While the present invention has been disclosed and described in terms of a preferred embodiment, the invention is not limited to the preferred embodiment. For example, it will be understood that the various mechanical arrangements disclosed herein for the removal of water from the reactor can be modified in number, shape, size, and configuration. In addition, various modifications to the operating conditions, feedstock, catalyst, slurry content, and stripping gases, among others, can be made without departing from the scope of the invention. In the claims that follow, any recitation of steps is not intended as a requirement that the steps be performed sequentially, or that one step be completed before another step is begun, unless explicitly so stated.

What is claimed is:

1. A method of reducing the concentration of water in a multi-phase reactor for Fischer-Tropsch synthesis containing an expanded slurry bed, including a water-rich region, the method comprising:
    a) removing a portion of slurry from the water-rich region in the reactor to form a water-rich slurry stream;
    b) removing the water-rich slurry stream from the reactor;
    c) removing water from the water-rich slurry stream in a water removal loop to form a water-reduced slurry stream; and
    d) returning the water-reduced slurry stream back to the reactor.

2. The method according to claim 1 wherein the water-rich region is located between ½ H and H and between ½ R and R, where H is the height of the expanded slurry bed and R is the radius of the expanded slurry bed.

3. The method according to claim 2 wherein the water-rich region is located between ¾ H and H and between ¾ R and ⅞ R.

4. The method according to claim 1 wherein at least 60% of the water initially present in the water-rich slurry stream is removed in step b).

5. The method according to claim 4 wherein at least 80% of water initially present in the water-rich slurry stream is removed.

6. The method according to claim 1, further including degassing the water-rich slurry stream prior to step (b).

7. The method according to claim 1 wherein step b) includes a technique selected from the group consisting of phase addition, phase creation, and stripping.

8. The method according to claim 1 wherein a difference in fluid densities causes slurry to flow through the water removal loop.

9. The method according to claim 1 wherein step b) is carried out using a semi-permeable barrier.

10. The method according to claim 1 wherein step b) is carried Out using a solid agent.

11. The method according to claim 1 wherein step b) is carried out using an external field or gradient.

12. The method according to claim 1 wherein step a) is carried out using a slurry removal device comprising a manifold having a plurality of intake ports.

13. The method according to claim 1 wherein the reactor has a wall and wherein step a) is carried out using a slurry removal device comprising a plurality of openings in said reactor wall.

14. The method according to claim 1 wherein step a) is carried out using a slurry removal device comprising an annular ring having at least one opening positioned in the water-rich slurry region.

15. A method for producing hydrocarbons comprising:
    a) contacting a synthesis gas with a hydrocarbon synthesis catalyst in a multi-phase reactor having an expanded slurry bed, including a water-rich slurry region, under reaction conditions effective to form gaseous and/or liquid product streams comprising hydrocarbons, water and secondary products from the synthesis gas;

b) removing a portion of slurry from the water-rich slurry region in the reactor to form a water-rich slurry stream;

c) flowing the water-rich slurry stream out of the reactor into a water removal zone and removing water from the water-rich slurry stream so as to form a water-reduced slurry; and d) returning the water-reduced slurry stream back into the reactor.

16. The method according to claim 15 wherein the water-rich slurry region is located between ½ H and H and between ½ R and R, where H is the height of the expanded slurry bed and R is the radius of the expanded slurry bed.

17. The method according to claim 15 wherein the water-rich slurry region is located between ¾ H and H and between ¾ R and ⅞ R.

18. The method according to claim 15 wherein at least 60% of water initially present in the water-rich slurry stream is removed.

19. The method according to claim 18 wherein at least 80% of water initially present in the water-rich slurry stream is removed.

20. The method according to claim 15 further including the step of degassing the water-rich slurry stream prior to step c).

21. The method according to claim 15 wherein step c) includes a technique selected from the group consisting of phase addition, phase creation, and stripping.

22. The method according to claim 15 wherein a difference in fluid densities causes slurry to flow through the water removal zone and back into the reactor.

23. The method according to claim 15 wherein the water removal zone includes a barrier separation system.

24. The method according to claim 15 wherein the water removal zone includes a solid agent separation system.

25. The method according to claim 15 wherein the water removal zone includes an external field or gradient separation system.

26. The method according to claim 15 wherein step b) is carried out using a slurry removal device comprising a manifold having a plurality of intake ports.

27. The method according to claim 15 wherein the reactor has a wall and wherein step b) is carried out using a slurry removal device comprising a plurality of openings in said reactor wall.

28. The method according to claim 15 wherein step b) is carried out using a slurry removal device comprising an annular ring having at least one opening positioned in the water-rich slurry region.

* * * * *